(12) United States Patent
Tubbs

(10) Patent No.: US 7,007,892 B2
(45) Date of Patent: Mar. 7, 2006

(54) INSULATING BAFFLE FOR A FLOOR SHEAR TRUSS

(75) Inventor: Gregory A. Tubbs, Marysville, WA (US)

(73) Assignee: The Boeing Company, Chicago, IL (US)

( * ) Notice: Subject to any disclaimer, the term of this patent is extended or adjusted under 35 U.S.C. 154(b) by 292 days.

(21) Appl. No.: 10/807,087

(22) Filed: Mar. 23, 2004

(65) Prior Publication Data
US 2005/0224647 A1 Oct. 13, 2005

(51) Int. Cl.
*B64C 1/10* (2006.01)
(52) U.S. Cl. .................. 244/118.5; 244/119; 244/129.1
(58) Field of Classification Search ............. 244/118.1, 244/118.5, 129.1, 129.4, 129.5, 1 R, 121; 52/1, 98; 220/89 A, 203; 137/68.19, 68.23, 137/68.27; 454/76
See application file for complete search history.

(56) References Cited

U.S. PATENT DOCUMENTS

| | | | | |
|---|---|---|---|---|
| 2,679,467 A | * | 5/1954 | Sherts ........................ | 52/208 |
| 4,089,140 A | * | 5/1978 | McIntyre et al. ............... | 52/98 |
| 4,432,514 A | * | 2/1984 | Brandon ................... | 244/118.5 |
| 4,498,261 A | * | 2/1985 | Wilson et al. .................... | 52/1 |
| 4,646,993 A | * | 3/1987 | Baetke ................... | 244/117 R |
| 4,867,271 A | | 9/1989 | Tschudin-Mahrer | |
| 5,085,017 A | | 2/1992 | Hararat-Tehrani | |
| 5,417,014 A | | 5/1995 | Vincent et al. | |
| 5,871,178 A | * | 2/1999 | Barnett et al. ........... | 244/118.5 |
| 6,264,141 B1 | | 7/2001 | Shim | |
| 6,435,455 B1 | * | 8/2002 | Holman et al. .......... | 244/118.5 |

* cited by examiner

*Primary Examiner*—Galen Barefoot
(74) *Attorney, Agent, or Firm*—Harness Dickey & Pierce P.L.C.

(57) ABSTRACT

An insulation baffle for a mobile platform. The baffle is secured to a structure separating different lobes of the mobile platform. The baffle includes a main body portion and at least one blow out portion. A perimeter of the blow out portion is defined by at least one recess. The recess also forms a web portion that connects the blow out portion with the main body portion. A depth of the recess is predetermined such that the web portion formed by the recess will sever when a pressure differential between the different lobes exceeds a predetermined threshold. When the web portion severs at least a section of the blow out portion separates from the main body portion to air to pass between the lobes so that the pressure differential is reduced to approximately zero.

19 Claims, 4 Drawing Sheets

US 7,007,892 B2

INSULATING BAFFLE FOR A FLOOR SHEAR TRUSS

FIELD OF THE SYSTEM

The present system relates to sound insulation panels for mobile platform, and more particularly to sound insulation panels with rapid decompression blow out portion for use between the upper and lower lobes of an aircraft.

BACKGROUND

Commercial aircraft generally include an upper lobe, e.g. passenger cabin, and lower lobe, e.g. cargo bay. In order to maintain a desired pressure differential between the upper and lower lobes, air pathways are often provided around the perimeter of a passenger cabin floor structure. Typically, a positive air pressure differential is maintained between the upper and lower lobes. That is, the air pressure in the upper lobe is generally higher than the air pressure in the lower lobe. More specifically, air is forced from the lower lobe to the upper lobe though a suitable duct system. Then, because the air pressure in the upper lobe is higher than the air pressure in the lower lobe, the air from the upper lobe is forced through the air pathways to the lower lobe.

In at least one known aircraft architecture, the air pathways are provided by openings between cross members of shear trusses that connect the aircraft fuselage structure to the passenger cabin floor structure. The air pathways are sized so that they will allow a sufficient flow of air from the upper lobe to the lower lobe to maintain the desired air pressure differential during normal operation of the aircraft. The air pathways are further sized such that during the occurrence of rapid decompression of the aircraft extremely large amounts of air will be allowed pass between the upper and lower lobes very quickly. Occurrences of rapid decompression are generally caused by a breach of the integrity of the outer skin of the air craft, e.g. a cargo bay door being dislodged. The rapid passage of large amounts of air allows the pressure differential between the upper and lower lobes to be rapidly reduced to approximately zero. This prevents the floor structure from buckling and causing damage to the fuselage structure during an occurrence of rapid decompression. However, noise from the lower lobe easily passes through these air pathways and can be bothersome to passengers in the upper lobe.

Therefore, it is extremely desirable to provide a noise barrier to minimize the transmission of noise from the lower lobe to the upper lobe through the air pathways. It is further extremely desirable to provide such a barrier that will not only allow sufficient air to flow from the upper lobe during normal operation but will also allow extremely large amounts of air to rapidly pass between the upper and lower lobes during rapid decompression of the aircraft.

SUMMARY

The present system and method are for relieving pressure differences between different sections of a mobile platform.

In a preferred embodiment, the system provides a noise insulation baffle for a mobile platform. The baffle is secured to a structure separating different lobes of the mobile platform. The baffle includes a main body portion and at least one blow out portion. A perimeter of the blow out portion is defined by at least one recess. The recess also forms a web portion that connects the blow out portion with the main body portion. A depth of the recess is predetermined such that the web portion formed by the recess will sever when a pressure differential between the different lobes exceeds a predetermined threshold. When the web portion severs, at least a section of the blow out portion separates from the main body portion to allow extremely large amounts air to rapidly pass between the lobes so that the pressure differential is quickly reduced to approximately zero.

In another preferred embodiment, a method is provided for reducing the transmission of noise between an upper lobe and a lower lobe of a mobile platform. The method includes securing a noise insulation baffle to a floor structure disposed between the upper and lower lobes. The insulation baffle includes at least one recess that defines a main portion and at least one blow out portion of the insulation baffle. The recess also forms a severable web portion that connects the main portion with the blow out portion. The method additionally includes aligning the blow out portion with an air pathway in the floor structure. Therefore, if the pressure differential between the upper and lower lobes exceeds a predetermined threshold, the web portion with sever allowing the blow out portion to separate from the main body portion. When the blow out portion separates from the main portion a passage is created in the insulation baffle such that extremely large amounts of air is allowed to rapidly flow through the passage and air pathway in the floor structure. Therefore, air is allowed to flow between the upper and lower lobes so that the air pressure differential is rapidly reduced to approximately zero.

The features, functions, and advantages can be achieved independently in various embodiments of the present system and method or may be combined in yet other embodiments.

BRIEF DESCRIPTION OF THE DRAWINGS

The present system and method will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the system, its application, or uses.

Figure 1:
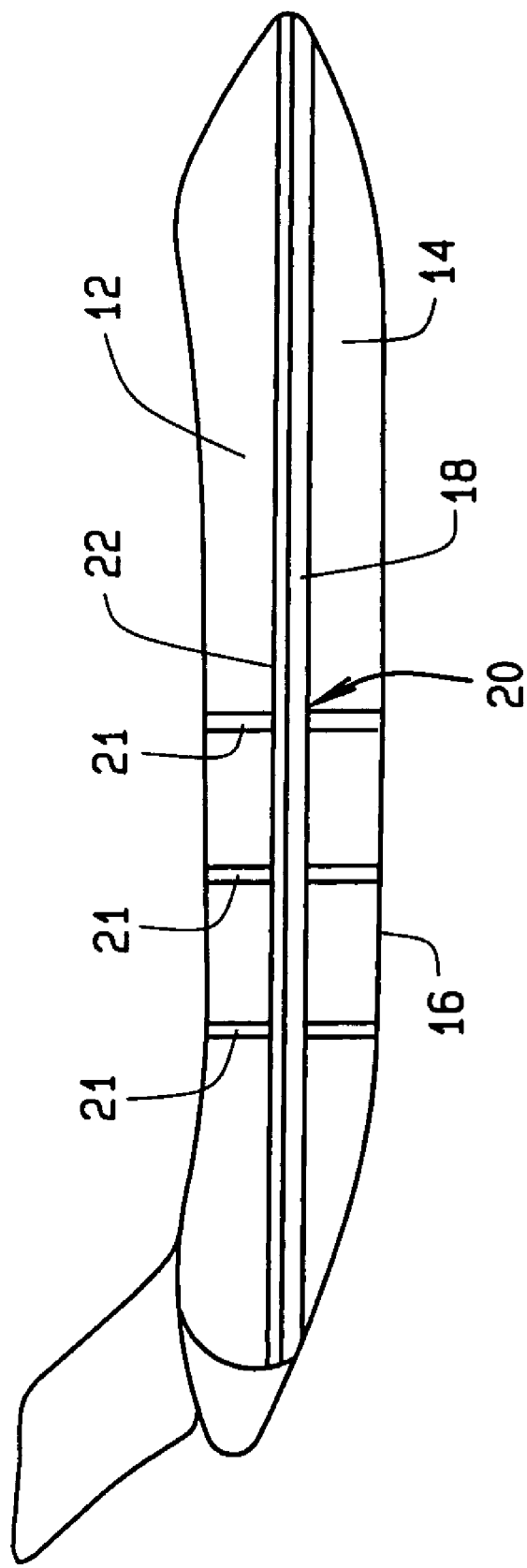
FIG. 1 is a sectional view of an mobile platform in accordance with the principles of the present system.

FIG. 1 is a sectional view of an aircraft 10 in accordance with the principles of the present system. It will be appreciated that while the present system is described in reference to an aircraft, the system can be implemented on any type of mobile platform or fixed structure in which an interior is pressurized. The aircraft 10 includes an upper lobe 12 and a lower lobe 14 enclosed in a fuselage 16. Generally, the lower lobe 14 includes cargo bays and mobile platform related equipment such as air conditioning packs, hydraulic systems, electronic equipment, etc. The upper lobe 12 generally includes the passenger and crew cabin, or additional cargo space, or both.

Figure 2:
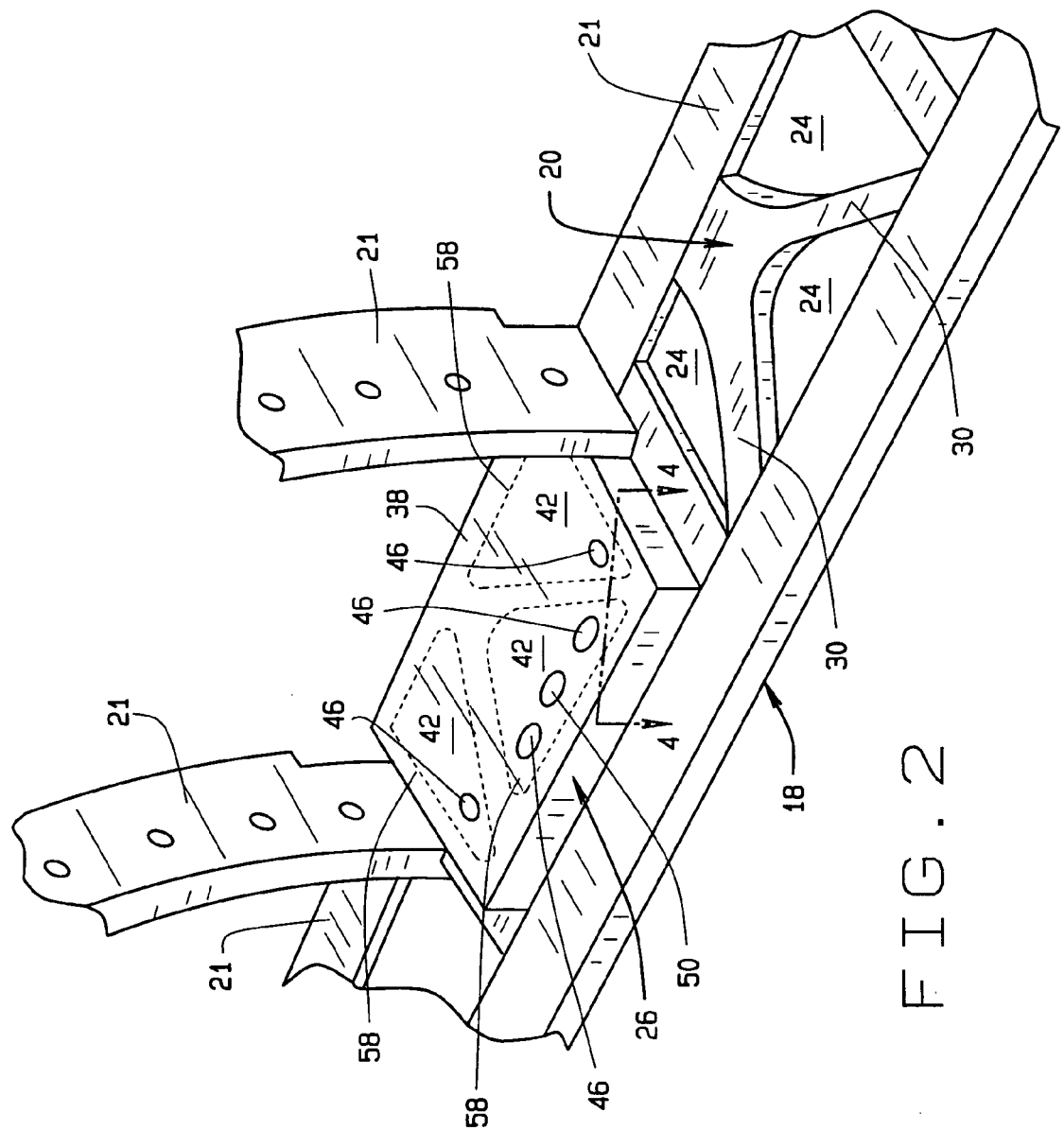
FIG. 2 is a perspective section view of a floor structure shown in FIG. 1 and an insulation baffle in accordance with a preferred embodiment of the present system.

A load bearing floor structure 18 separates the upper and lower lobes 12 and 14 and includes a plurality of shear trusses 20, shown more clearly in FIG. 2. The shear trusses 20 are located between the upper lobe 12 and the lower lobe 14 and connect a fuselage structure 21 of the aircraft to the rest of the floor structure 18. The fuselage structure 21 is shown more clearly in FIG. 2. Additionally, the shear trusses 20, along with the other components of the floor structure 18 (not shown), provide support for a passenger cabin floor 22 and other fixtures within the passenger cabin (not shown).

Generally, during normal operation of the aircraft 10 an acceptable pressure differential is maintained between the upper and lower lobes 12 and 14. Specifically, there is a positive air flow from the upper lobe 12 to the lower lobe 14. Air from the lower lobe 14 is circulated through a duct system (not shown) to the upper lobe 12. The pressure in the upper lobe 12 is sufficiently higher than the pressure in the lower lobe 14 such that the air from the upper lobe 12 is forced though air pathways 24 in the shear trusses 20. Thus, the air is circulated between the upper and lower lobes 12 and 14. During a rapid decompression of the aircraft 10, caused by such things as a breach in the skin of the aircraft 10, e.g. a cargo door becoming dislodged, the pressure differential will dramatically increase in a very short period of time. This rapid decompression can cause the floor structure 18 to buckle and cause sever damage to the fuselage structure 21.

FIG. 2 is a perspective section view of the floor structure 18 illustrating one of the shear trusses 20 and a noise insulation baffle 26, in accordance with a preferred embodiment of the present system. The shear trusses 20 include cross members 30 that define the air pathways 24 through which air flows to maintain the desired pressure differential between the upper lobe 12 and the lower lobe 14. As described above, the shear trusses 20 connect the fuselage structure 21 of the aircraft 10 to the floor structure 18 and assist in supporting the load of passenger cabin floor 22 and other structural members coupled to the passenger cabin floor 22 or directly to the floor structure 18.

Generally, the passenger cabin floor 22 blocks the flow of air between the upper lobe 12 and the lower lobe 14. However, vents in an interior wall of the passenger cabin (not shown) and the air pathways 24, formed by the truss cross members 30, allow air to flow between the upper lobe 12 and the lower lobe 14. During normal operation of the aircraft 10, this flow of air allows the desired air pressure differential between the upper and lower lobes 12 and 14 to be maintained. Additionally, the air pathways 24 can be utilized to route utilities such as wires and fluid conduits between the upper and lower lobes 12 and 14. However, undesirable noise from the lower lobe 14 may travel through the air pathways 24 and disturb passengers, or crew, in the upper lobe 12.

FIG. 2 shows the noise insulation baffle 26 as resting on the shear truss 20. In a preferred form, the insulation baffle 26 is formed as a single piece part. Further, the noise insulation baffle 26 includes a main body 38 and at least one blow out plug 42. In a preferred form, the blow out plug 42 includes at least one air hole 46. Accordingly, if the insulation baffle 26 includes a plurality of blow out plugs 42, at least one of the blow out plugs 42 includes at least one air hole 46. In operation, each air hole 46 allows air to flow from the upper lobe 12 to the lower lobe 14 through air pathways 24. Accordingly, the air holes 46 are positioned so that the air holes 46 communicate with the air pathways 24. The noise insulation baffle 26, including the main body 38 and the blow out plugs 42 are constructed of any suitable material to minimize noise transmitted from the lower lobe 14 to the upper lobe 12. For example, the insulation baffle 26 can be constructed of, for example, melamine foam or polyimide solimide foam.

Figure 3:
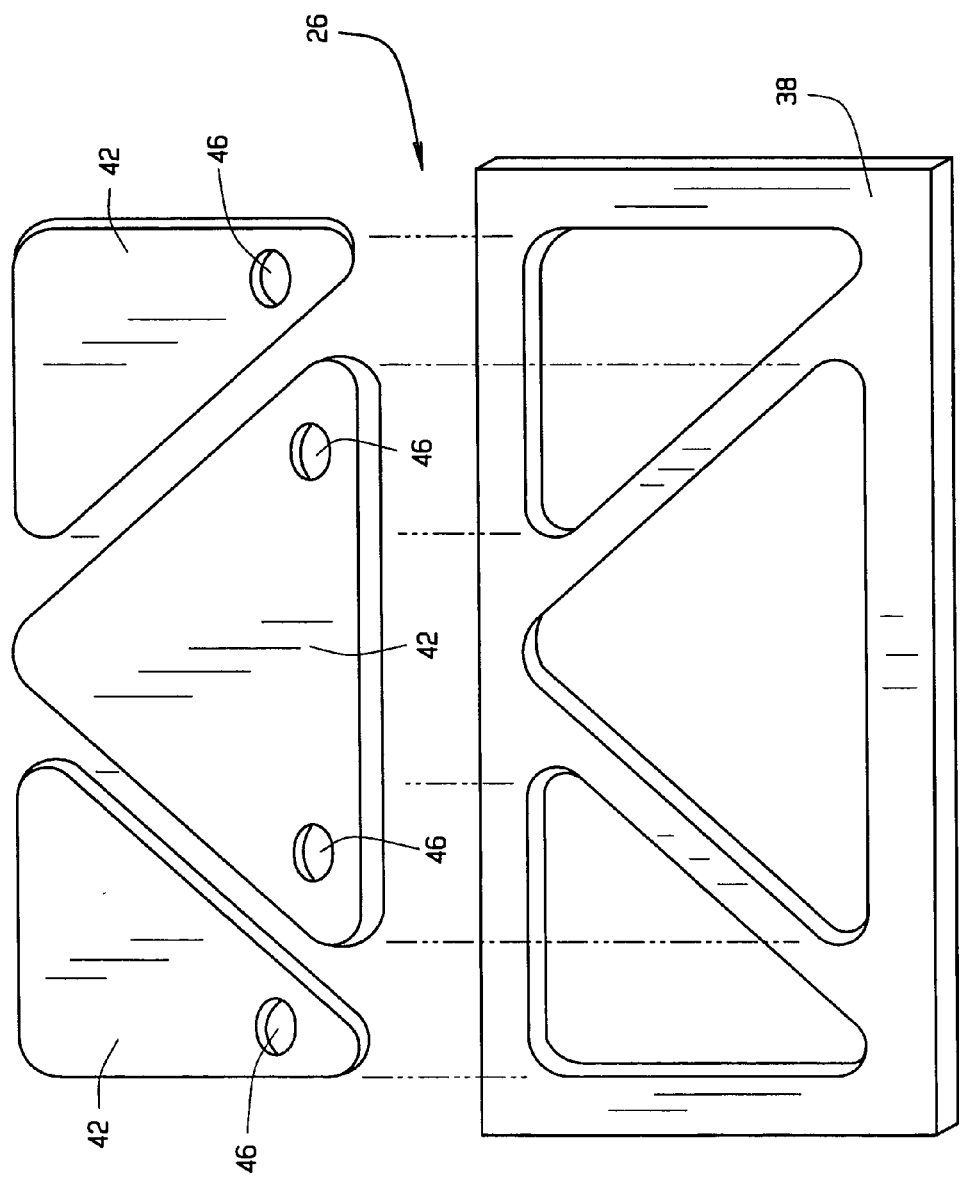
FIG. 3 is an exploded view of the insulation baffle shown in FIG. 2.

In a preferred embodiment when the air pressure in the upper lobe 12 differs from the air pressure in the lower lobe 14 by a pre-determined amount, the blow out plugs 42 are adapted to separate from the main body 38. More specifically, during rapid decompression of the aircraft 10, an air pressure differential between the air pressure in the upper lobe 12 and the air pressure in the lower lobe 14 rapidly exceeds a predetermined threshold. This rapid increase in the pressure differential forces the blow out plugs 42 to separate from the main body 38. Accordingly, the separation of the blow out plugs 42 from the main body 38 creates an additional passageway for extremely large amounts of air to rapidly flow between the upper and lower lobes 12 and 14. Therefore, the air pressure differential is quickly reduced to approximately zero to prevent damage to floor structure 18 and the fuselage structure 21. In one preferred embodiment, the blow out plugs 42 are shaped and sized to correspond to the shape and size of the associated air pathways 24, thereby maximizing the speed with which the pressure differential reaches approximately zero. FIG. 3 illustrates the insulation baffle 26 with the blow out plugs 42 separated from the main body 38.

Referring again to FIG. 2, the insulation baffle 26 is secured to the floor structure 18 using any suitable fastening means. For example, the insulation baffle 26 can be secured to the floor structure and/or shear truss 20 using a clip, a strap, a tie-wrap, a nut and bolt, or any other fastening means. In an alternative preferred embodiment, at least one blow out plug 42 includes a utility aperture 50 that allows routing of utilities between the upper lobe 12 and the lower lobe 14. Alternatively, one or more of the blow out plugs 42 may be removed to allow for the routing of the utilities.

Figure 4:
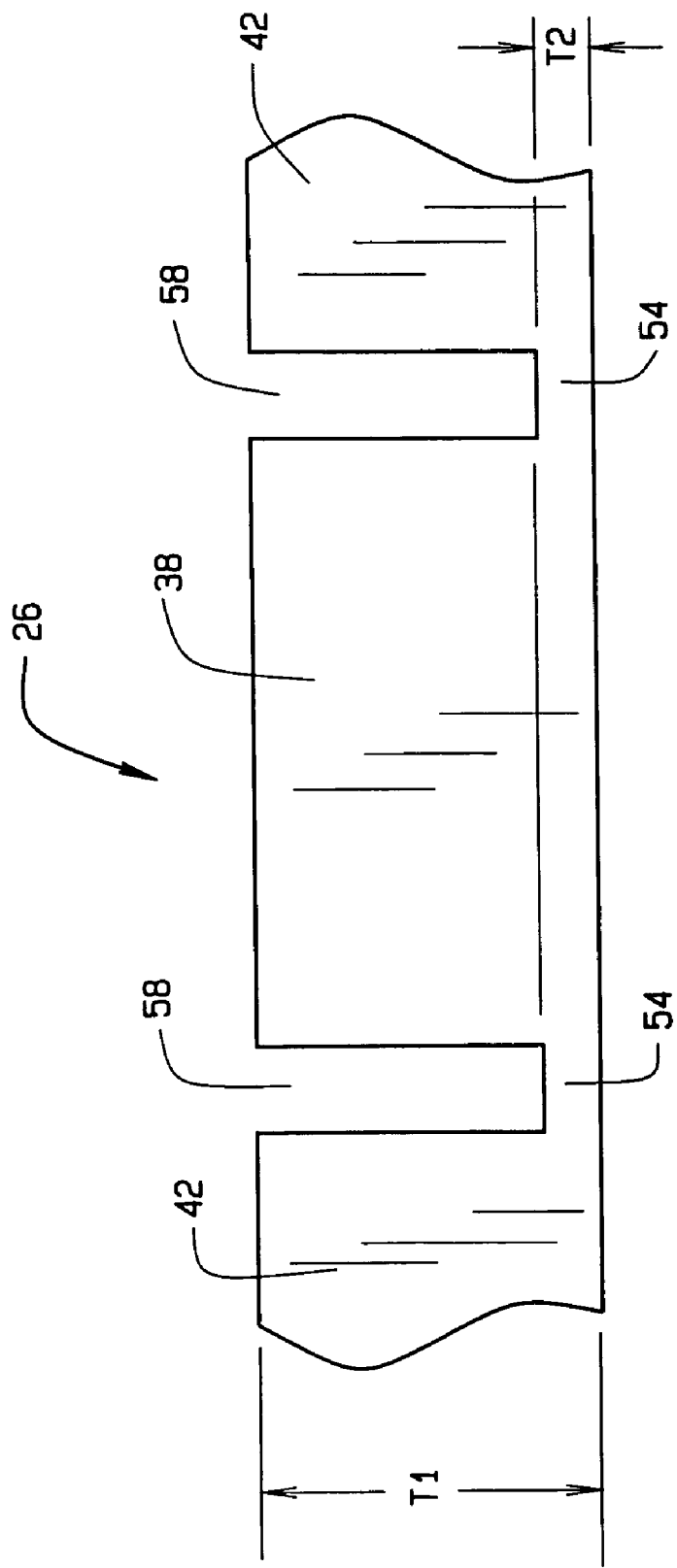
FIG. 4 is a cross sectional view of the insulation baffle taken along a line 4—4, as shown in FIG. 2.

With reference now to FIG. 4, a cross section of the insulation baffle 26 along line 4—4 of FIG. 3 is illustrated. The cross section shows the main body 38 and two blow out plugs 42. Each of the blow out plugs 42 are connected to the main body 38 via a web portion 54. The insulation baffle 26 is preferentially formed as one continuous piece of material having a thickness T1. The web portions 54 have a reduced thickness T2 that creates voids or recess 58 in the insulation baffle 26. The recesses 58 define at least a portion of a perimeter of each of the blow out plugs 42. The thickness T2 of the web portions 54 is selected such that when the pressure differential between the upper lobe 12 and the lower lobe 14 exceeds the predetermined threshold, the web portions 54 yield, tear, or otherwise allow at least a portion of the blow out plugs 42 to separate from the main body 38.

In a preferred embodiment, the recess 58 extends around the entire perimeter of the blow out plugs 42. In another preferred embodiment the recess 58 intermittently extends around the perimeter of the blow out plugs 42. That is, at intermittent portions along the perimeter of the blow out plugs 42, the recess 58 extends through the entire thickness T1 of the insulation baffle 26 to form a perforated perimeter around the blow out plugs 42. The number, length, and spacing of the perforations are chosen such that when the pressure differential is exceeded the blow out plugs 42 separate from the main body 38 along the perforated perimeter.

In yet another preferred form, the recess 58 and web portions 54 extend only partially around the perimeter of the blow out plug 42. More specifically, in an exemplary form the perimeter of the blow out plugs 42 is in the shape of a triangle with the recess 58 extending along two sides of the triangular shaped blow out plug 42. Therefore, if the pressure differential exceeds the pre-determined threshold, the web portions 54 tear leaving the blow out plugs 42 connected to the main body 38 along the third side. Therefore, the third side connects the blow out plugs 42 to the main body 38 in a hinge-like manner. Thus, a pressure difference across the insulation baffle 26 that exceeds the maximum threshold causes the blow out plugs 42 to separate along the recess 58 while the blow out plugs 42 remain connected to the main body 38 along the third side. Although the shape of the blow out plugs 42 have been generally described and shown as triangular, it should be understood that recess 58 can form the blow out plugs 42 in any desirable shape, e.g. a square, a rectangle, a polygon, a circle or an oval.

As those skilled in the art will appreciate, the present system provides an effective noise baffle between the upper and lower lobes of the aircraft while also providing a pressure relief system to quickly equalize the pressure between the upper and lower lobes during rapid decompression of the aircraft. Additionally, because the panels can be made of lightweight material such as foam and easily secured in place, the present system provides a convenient and inexpensive system and method for reducing noise transmission between the upper and lower lobes.

While various preferred embodiments have been described, those skilled in the art will recognize modifications or variations which might be made without departing from the inventive concept. The examples illustrate the system and are not intended to limit it. Therefore, the description and claims should be interpreted liberally with only such limitation as is necessary in view of the pertinent prior art.

What is claimed is:

1. A pressure relief apparatus for use within a pressurized interior area of a mobile platform, said apparatus comprising:
    a one piece noise insulation baffle secured directly to a floor structure of the mobile platform, the noise insulation baffle including:
        a main body; and
        at least one blow out plug having a perimeter at least partially formed by a recessed portion, the perimeter forming the blow out plug in a shape that matches a shape of an air pathway in the floor structure covered by the noise insulation baffle;
        wherein the recessed portion is adapted to sever if a pressure differential between an upper lobe and a lower lobe of the mobile platform exceeds a predetermined threshold, thereby at least partially separating the blow out plug from the main body.

2. The apparatus according to claim 1, wherein the noise insulation baffle is constructed of a material suitable to substantially reduce noise transmitted from the lower lobe to the upper lobe.

3. The apparatus according to claim 1, wherein the recessed portion extends along only a portion of the perimeter.

4. The apparatus according to claim 3, wherein the recessed portion extends along the entire perimeter such that the blow out plug completely separates from the main body when the pressure differential exceeds the threshold.

5. The apparatus according to claim 1, wherein the recessed portion forms intermittent perforations extending along at least a portion of the perimeter, wherein the perforations extend entirely through a thickness of the noise insulation baffle.

6. The apparatus according to claim 1, further comprising a portion of the perimeter with the same thickness as the body such that the blow out plug is connected to the main body in a hinge-like manner.

7. The apparatus according to claim 1, wherein the blow out plug includes at least one an air hole.

8. The apparatus according to claim 1, wherein the blow out plug includes a utility aperture for routing utilities between the upper lobe and the lower lobe.

9. A noise insulation baffle for a mobile platform, said noise insulation baffle comprising:
    a main body portion secured directly to a truss structure of the mobile platform;
    at least one blow out portion having a perimeter forming the blow out portion in a shape that matches a shape of an air pathway in the truss structure covered by the blow out portion; and
    at least one recess defining the perimeter of the blow out portion, the recess adapted to form a web portion connecting the blow out portion with the main body portion, the web portion adapted to sever such that the blow out portion separates from the main body portion when a pressure differential between an upper lobe and a lower lobe of the mobile platform exceeds a predetermined threshold.

10. The baffle according to claim 9, wherein the baffle comprises a material suitable to substantially reduce noise transmitted from the lower lobe to the upper lobe.

11. The baffle according to claim 10, wherein the material comprises melamine foam.

12. The baffle according to claim 10, wherein the material comprises polyimide solimide foam.

13. The baffle according to claim 9, wherein the blow out portion comprises at least one air hole adapted to provide an air passage between an upper and an lower lobe of the mobile platform.

14. The baffle according to claim 9, wherein the baffle further comprises at least two blow out plug portions.

15. A mobile platform comprising:
    an upper lobe;
    a lower lobe;
    a floor structure between the upper lobe and the lower lobe, the floor structure including at least one air pathway; and
    a noise insulation baffle constructed of a noise reducing foam that substantially reduces the transmission of noise from the lower lobe to the upper lobe, the noise insulation baffle comprising:
        a main body portion secured directly to a floor structure of the mobile platform;
        at least one blow out portion having a perimeter forming the blow out portion in a shape that matches a shape of the air pathway in the floor structure covered by the blow out portion; and
        at least one recess defining the perimeter of the blow out portion, the recess adapted to form a web portion connecting the blow out portion with the main body portion, the web portion adapted to sever such that the blow out portion separates from the main body portion when a pressure differential between an upper lobe and a lower lobe of the mobile platform exceeds a predetermined threshold.

16. The mobile platform according to claim 15, wherein the baffle further comprises at least one utility aperture for providing a passage of utilities between an upper and an lower lobe of the mobile platform.

17. The mobile platform according to claim 15, wherein the blow out portion comprises at least one air hole adapted to provide an air passage between the upper and the lower lobe of the mobile platform.

18. The mobile platform according to claim 15, wherein the noise insulation is constructed of one of melamine foam and polyimide solimide foam.

19. A method for reducing noise transmission between a first lobe and a second lobe of a mobile platform, the method comprising:

securing a noise insulation baffle directly to a floor structure disposed between the first and second lobes, wherein the insulation baffle is constructed of one of melamine foam and polyimide solimide foam and includes at least one recess that defines a main portion and at least one blow out portion, the recess further forms a severable web portion connecting the main portion and the blow out portion and a perimeter of the blow out portion that defines a shape of the blow out portion that matches a shape of an air pathway in the floor structure; and aligning the blow out portion with the air pathway so that if the pressure differential between the first and second lobes exceeds a predetermined threshold, the web portion will sever allowing the blow out portion to completely separate from the main body portion so that the pressure differential will rapidly be reduced to approximately zero.

\* \* \* \* \*